United States Patent
Hwang et al.

(10) Patent No.: US 8,834,632 B2
(45) Date of Patent: Sep. 16, 2014

(54) APPARATUS AND SYSTEM FOR MANUFACTURING A CARBON NANOTUBE

(75) Inventors: Ho-Soo Hwang, Suwon-si (KR); Sung-Soo Kim, Chungbuk (KR); Jung-Keun Cho, Seoul (KR)

(73) Assignee: Korea Kumho Petrochemical Co., Ltd (KR)

( * ) Notice: Subject to any disclaimer, the term of this patent is extended or adjusted under 35 U.S.C. 154(b) by 1528 days.

(21) Appl. No.: 11/987,477

(22) Filed: Nov. 30, 2007

(65) Prior Publication Data
US 2010/0278713 A1  Nov. 4, 2010

(30) Foreign Application Priority Data
Aug. 21, 2007  (KR) .................. 10-2007-0083759

(51) Int. Cl.
*C01B 31/02* (2006.01)
*B01J 19/00* (2006.01)
*B82Y 40/00* (2011.01)
*B82Y 30/00* (2011.01)

(52) U.S. Cl.
CPC ............. *C01B 31/0233* (2013.01); *B82Y 40/00* (2013.01); *B82Y 30/00* (2013.01); *Y10S 977/843* (2013.01)
USPC .................. 118/719; 423/447.3; 977/843

(58) Field of Classification Search
USPC ........... 423/447.3, 445 B; 977/742, 842, 843; 422/129
See application file for complete search history.

(56) References Cited

U.S. PATENT DOCUMENTS

| 5,217,501 A | * | 6/1993 | Fuse et al. ................ 29/25.01 |
| 2002/0033136 A1 | * | 3/2002 | Savage et al. ............ 118/719 |
| 2004/0265211 A1 | * | 12/2004 | Dillon et al. ........... 423/447.3 |
| 2006/0086834 A1 | * | 4/2006 | Pfeffer et al. .................. 241/5 |
| 2006/0219171 A1 | * | 10/2006 | Sasaki et al. .............. 118/719 |
| 2007/0231246 A1 | * | 10/2007 | Hwang et al. .............. 423/460 |
| 2007/0246364 A1 | * | 10/2007 | Amlani et al. ............. 204/547 |
| 2009/0226294 A1 | * | 9/2009 | Sekido et al. .............. 414/806 |

FOREIGN PATENT DOCUMENTS

| JP | 06-120159 | 4/1994 |
| JP | 2007-045637 | 2/2007 |
| JP | 2007/091485 | 4/2007 |
| JP | 2007-161579 | 6/2007 |
| WO | WO 2007/064148 | 6/2007 |

OTHER PUBLICATIONS

JP 2007-129177 (Machine translation); Sekido et al., May 24, 2007.*
Office Action dated Mar. 1, 2011 issued in corresponding Japanese Application No. 2008-078752.
Office Action dated Aug. 5, 2010 issued in corresponding Chinese Application No. 200810002599.7 and English translation thereof.

* cited by examiner

*Primary Examiner* — Parviz Hassanzadeh
*Assistant Examiner* — Nathan K Ford
(74) *Attorney, Agent, or Firm* — Sterne Kessler Goldstein & Fox P.L.L.C.

(57) ABSTRACT

In a method of manufacturing a carbon nanotube, a boat configured to receive substrates is positioned outside of a synthesis space where the carbon nanotube is synthesized. The substrates are loaded into the boat. The boat is then transferred to the synthesis space. A process for forming the carbon nanotube is performed on the substrates in the synthesis space to form the carbon nanotube. Thus, the carbon nanotube may be effectively manufactured.

4 Claims, 10 Drawing Sheets

APPARATUS AND SYSTEM FOR MANUFACTURING A CARBON NANOTUBE

CROSS-REFERENCE TO RELATED APPLICATIONS

This application claims priority under 35 USC §119 to Korean Patent Application No. 2007-83759, filed on Aug. 21, 2007 in the Korean Intellectual Property Office (KIPO), the contents of which are herein incorporated by reference in their entirety.

BACKGROUND OF THE INVENTION

1. Field of the Invention

Example embodiments of the present invention relate to a method of manufacturing a carbon nanotube, and an apparatus and a system for performing the same. More particularly, example embodiments of the present invention relate to a method of manufacturing a carbon nanotube using a reaction between a catalyst and a reaction gas, and an apparatus and a system for performing the method.

2. Description of the Related Art

Generally, a carbon nanotube has a nanometer-scale diameter. The carbon nanotube may have a hexagonal annular shape where three carbon atoms are bonded to one carbon atom. Further, the hexagonal annular shape may be repeatedly arranged in a honeycomb pattern to form a plane. The plane on which the hexagonal annular shape is repeatedly arranged may be rolled to form the carbon nanotube having a cylindrical shape.

The carbon nanotube may have metallic conductive characteristics or semiconducting characteristics in accordance with the structure of the carbon nanotube. Further, the carbon nanotube may have excellent quantum, electrical, mechanical and chemical characteristics. Thus, the carbon nanotube is widely used in various fields such as electron emitters, secondary batteries, hydrogen fuel cells, micro-components for medicine and engineering, high-performance composite materials, electrostatic components, electromagnetic shielding, etc.

Methods of manufacturing the carbon nanotube may include a laser deposition process, a plasma-enhanced chemical vapor deposition (PECVD) process, a thermal chemical vapor deposition (CVD) process, a flame synthesis process, an electric discharge process, a thermal decomposition process, etc. Here, the thermal decomposition process is generally used for the method of manufacturing the carbon nanotube.

According to the thermal decomposition process, a reaction gas such as a hydrocarbon gas is thermally decomposed. The thermally decomposed reaction gas is reacted with a catalyst including a transition metal, such as iron, to form the carbon nanotube.

Particularly, a substrate on which the catalyst is formed is transferred to a reaction chamber, in which a heater is provided, using a separate transfer unit. The reaction gas is introduced into the reaction chamber to react the catalyst with the reaction gas, thereby forming the carbon nanotube.

However, the transfer unit may transfer the substrates one by one to the reaction chamber. Thus, the conventional process for manufacturing the carbon nanotube may have low efficiency.

SUMMARY OF THE INVENTION

Example embodiments of the present invention provide a method of manufacturing a carbon nanotube that is capable of effectively transferring substrates used for manufacturing the carbon nanotube.

Example embodiments of the present invention also provide an apparatus for performing the above-mentioned method.

Example embodiments of the present invention still also provide a system for manufacturing a carbon nanotube including the above-mentioned apparatus.

In a method of manufacturing a carbon nanotube in accordance with one aspect of the present invention, a boat configured to receive substrates is positioned outside of a synthesis space where the carbon nanotube is synthesized. The substrates are loaded into the boat. The boat is then transferred to the synthesis space. A process for forming the carbon nanotube is performed on the substrates in the synthesis space to form the carbon nanotube.

According to one example embodiment, the boat may have a multi-step structure configured to receive the substrates.

According to another example embodiment, after forming the carbon nanotube, the boat may be transferred to the outside of the synthesis pace. Further, after transferring the boat into the synthesis space, the synthesis space may be isolated from the outside.

An apparatus for manufacturing a carbon nanotube in accordance with another aspect of the present invention includes a reaction chamber, a boat, a substrate-transferring unit and a boat-transferring unit. The reaction chamber has a synthesis space where the carbon nanotube is synthesized. Substrates for manufacturing the carbon nanotube are loaded into the boat. The substrate-transferring unit is arranged outside of the reaction chamber to load the substrates into the boat outside of the reaction chamber. The boat-transferring unit transfers the boat to the reaction chamber and vice versa.

According to one example embodiment, the boat may have a multi-step structure configured to receive the substrates. The boat-transferring unit may include a transferring member combined with the boat, a guiding member for guiding the movement of the transferring member, and a driving member for driving the transferring member to move between the inside and the outside of the reaction chamber.

According to another example embodiment, the apparatus may further include a shutter for isolating the reaction chamber from the outside when the boat is transferred into the reaction chamber. Further, the shutter may be integrally formed with the transferring member.

According to still another example embodiment, the substrate-transferring unit may include a linkage for holding the substrates in the boat, the linkage being rotated on a horizontal plane, a lifter combined with the linkage to upwardly and downwardly move the linkage, a slider combined with the lifter to horizontally move the lifter, and a driving member for driving the linkage, the lifter and the slider, respectively.

A system for manufacturing a carbon nanotube in accordance with still another aspect of the present invention includes a reaction chamber, a boat, a substrate-transferring unit, a boat-transferring unit, a coating unit and a collecting unit. The reaction chamber has an inner space where the carbon nanotube is synthesized. Further, a reaction gas is introduced into the reaction chamber. The boat receives a plurality of substrates on which a catalyst reacted with the reaction gas is coated. The substrate-transferring unit is arranged outside of the reaction chamber to load the substrates into the boat outside of the reaction chamber. The boat-transferring unit transfers the boat between the outside and the inside of the reaction chamber. The coating unit coats the catalyst on the substrates. The collecting unit separates the carbon nanotube from the substrates and collects the separated carbon nanotube.

According to one embodiment, the coating unit and the collecting unit may be vertically stacked. Further, the coating unit may include a hopper for storing and releasing the catalyst, a selecting member for selecting the catalyst released from the hopper by sizes of the catalyst and for releasing the selected catalyst to the substrates moved under the selecting member, and a vibrating member combined with the selecting member to uniformly distribute the catalyst released from the hopper by vibrating the selecting member.

The collecting unit may include a first separating member for rotating the substrates having the carbon nanotube to a vertical orientation to primarily separate the carbon nanotube from the substrates, a second separating member for secondarily separating the carbon nanotube remaining on the rotated substrates, and a receptacle for collecting the carbon nanotube separated from the substrates.

The second separating member may include a contactor making contact with the substrates to separate the carbon nanotube remaining on the substrates by applying physical force to the substrates.

According to another embodiment, the system may further include a system chamber for receiving the reaction chamber, the first transferring unit, the second transferring unit, the coating unit and the collecting unit to isolate the reaction chamber, the first transferring unit, the second transferring unit, the coating unit and the collecting unit from the outside of the system chamber.

Further, the system may further include an induction fan installed at a top portion of the system chamber to induce an inert gas introduced into the system chamber toward a lower space of the system chamber.

Furthermore, the system may further include a storing unit installed in the system chamber to temporarily store the substrates. The storing unit may have a receptacle for collecting the carbon nanotube partially separated from the substrates.

According to the present invention, substrates for synthesizing a carbon nanotube may be loaded into a boat having a multi-step structure. The boat may be transferred into a reaction chamber. Thus, the substrates may be effectively transferred.

As a result, a process for manufacturing the carbon nanotube using the substrates may be effectively performed.

Further, the boat with the substrates may slide on a guide member having a rail shape so that the boat may not be deflected when the boat is transferred to the reaction chamber.

BRIEF DESCRIPTION OF THE DRAWINGS

The above and other features and advantages of the invention will become readily apparent by reference to the following detailed description when considered in conjunction with the accompanying drawings wherein.

DESCRIPTION OF THE EMBODIMENTS

Figure 1:
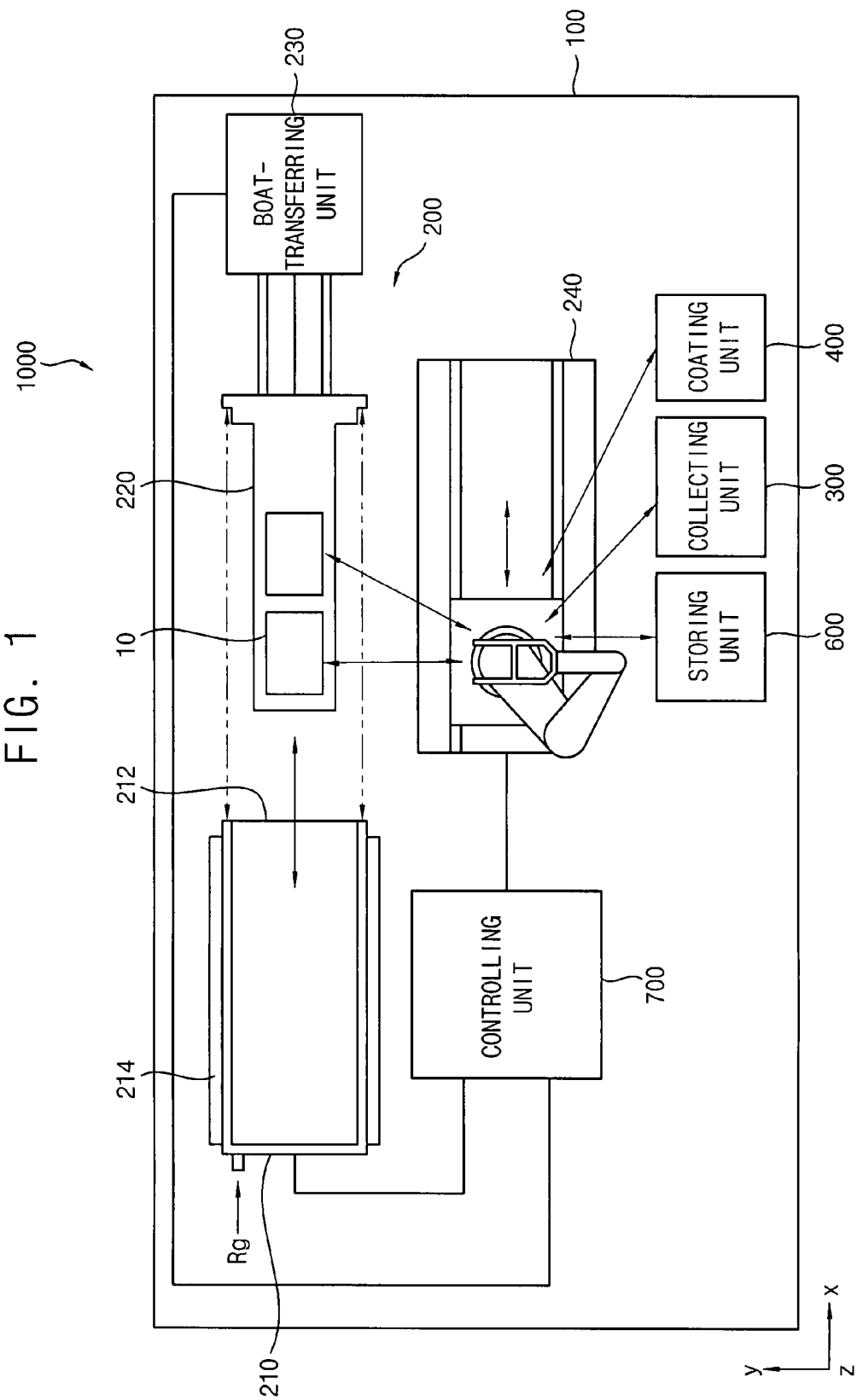
FIG. 1 is a plan view illustrating a system for manufacturing a carbon nanotube in accordance with an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of One or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
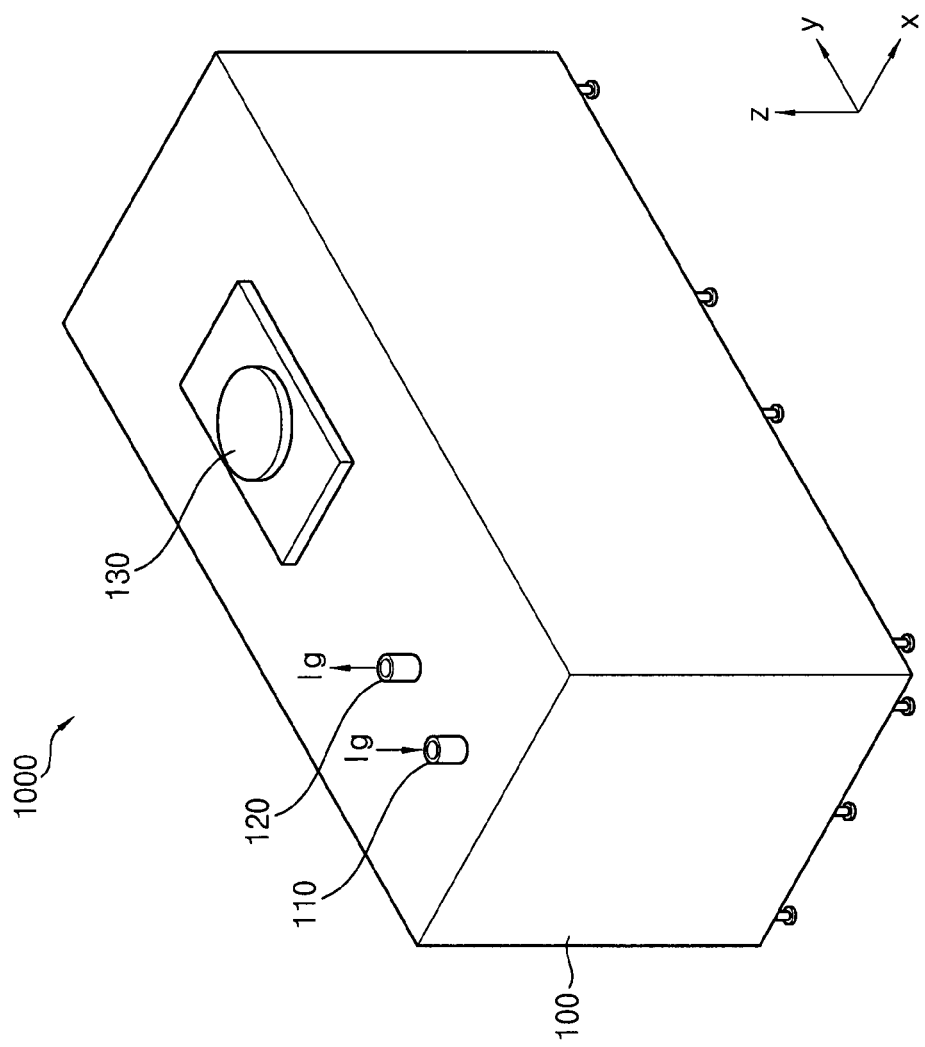
FIG. 2 is a perspective view illustrating the system in FIG. 1.

FIG. 1 is a plan view illustrating a system for manufacturing a carbon nanotube in accordance with an example embodiment of the present invention, and FIG. 2 is a perspective view illustrating the system in FIG. 1.

Referring to FIGS. 1 and 2; a system 1000 for manufacturing a carbon nanotube in accordance with this example embodiment includes a system chamber 100, an apparatus 200 for manufacturing the carbon nanotube, a collecting unit 300 and a coating unit 400.

The system chamber 100 has a space in which the apparatus 200, the coating unit 400 and the collecting unit 300 are arranged. That is, the system chamber 100 forms the exterior of the system 1000 to isolate the apparatus 200, the coating unit 400 and the collecting unit 300 from the outside. In this example embodiment, the system chamber 100 may have a hexahedral shape in order to allow easy installation of the system chamber 100 and to provide the system chamber 100 with a good external appearance.

To prevent oxidation of the system chamber 100 during manufacturing of the carbon nanotube 20 (see FIG. 7), an inert gas Ig may be introduced into the system chamber 100. An example of the inert gas Ig may include nitrogen gas. Thus, the system chamber 100 may have an inlet through which the inert gas Ig is injected, and an outlet through which an excessive portion of the inert gas Ig is exhausted. Further, the system chamber 100 may have a positive internal pressure to prevent air from entering from the outside into the system chamber 100.

An induction fan 130 is installed on a top portion of the system chamber 100. The induction fan 130 induces the inert gas Ig toward a lower space in the system chamber 100 to prevent the floating of particles generated when the carbon nanotube 20 is manufactured.

The apparatus 200 is installed in the system chamber 100. The apparatus 200 substantially synthesizes the carbon nanotube 20. The apparatus 200 includes a reaction chamber 210, a boat 220, a boat-transferring unit 230 and a substrate-transferring unit 240.

The reaction chamber 210 has a space where the carbon nanotube 20 is synthesized. Thus, substrates 10 used for synthesizing the carbon nanotube 20 are loaded into the reaction chamber 210. Here, although the substrates 10 may be classified into various types of substrates, the same reference numeral 10 is used to refer to the substrates for convenience of explanation.

A catalyst layer 30 (see FIG. 7) as a seed layer for growing the carbon nanotube 20 is formed on the substrates 10. Examples of the catalyst layer 30 may include a transition metal such as iron, platinum, cobalt, nickel, yttrium, and a metal alloy thereof, and a porous material such as magnesium oxide (MgO), aluminum oxide ($Al_2O_3$), silicon oxide ($SiO_2$), etc.

In this example embodiment, the reaction chamber 210 may have a cylindrical shape extending along any one of an x-axis and a y-axis. In this case, an entrance 212 through which the substrates 10 are loaded may be formed at a side of the reaction chamber 210.

Here, the carbon nanotube 20 may be formed at a high temperature of about 500° C. to about 1,100° C. Thus, a heater 214 is formed at an outer face of the reaction chamber 210. For example, the heater 214 may have a spiral shape surrounding the outer face of the reaction chamber 210. Further, it may be important to uniformly maintain an internal temperature of the reaction chamber 210 in manufacturing the carbon nanotube 20. Thus, a contact area between the heater 214 and the outer face of the reaction chamber 210 may be advantageously large.

Further, the reaction chamber 210 may include a high temperature-resistant material. For example, the material of the reaction chamber 210 may include quartz, graphite, etc.

A reaction gas Rg is introduced into the reaction chamber 210. The reaction gas Rg is reacted with the catalyst layer on the substrates 10 to form the carbon nanotube 20. An example of the reaction gas Rg may include hydrocarbon ($C_nH_m$).

Here, when the substrates 10 heated during manufacturing of the carbon nanotube 20 are exposed to the outside of the reaction chamber 210, the carbon nanotube 20 may be radically oxidized. Thus, a jacket (not shown) for introducing a cooling fluid into the reaction chamber 210 may be additionally installed at the outer face of the reaction chamber 210.

The boat 220 is loaded with the substrates 10 for manufacturing the carbon nanotube 20. The boat-transferring unit 230 transfers the boat 220 from the outside of the reaction chamber 210 to the inside of the reaction chamber 210 through the entrance 212. Further, the boat-transferring unit 230 transfers the boat 220 from the inside of the reaction chamber 210 to the outside of the reaction chamber 210.

Hereinafter, the boat 220 and the boat-transferring unit 230 are illustrated in detail with reference to FIGS. 3 to 5.

Figure 3:
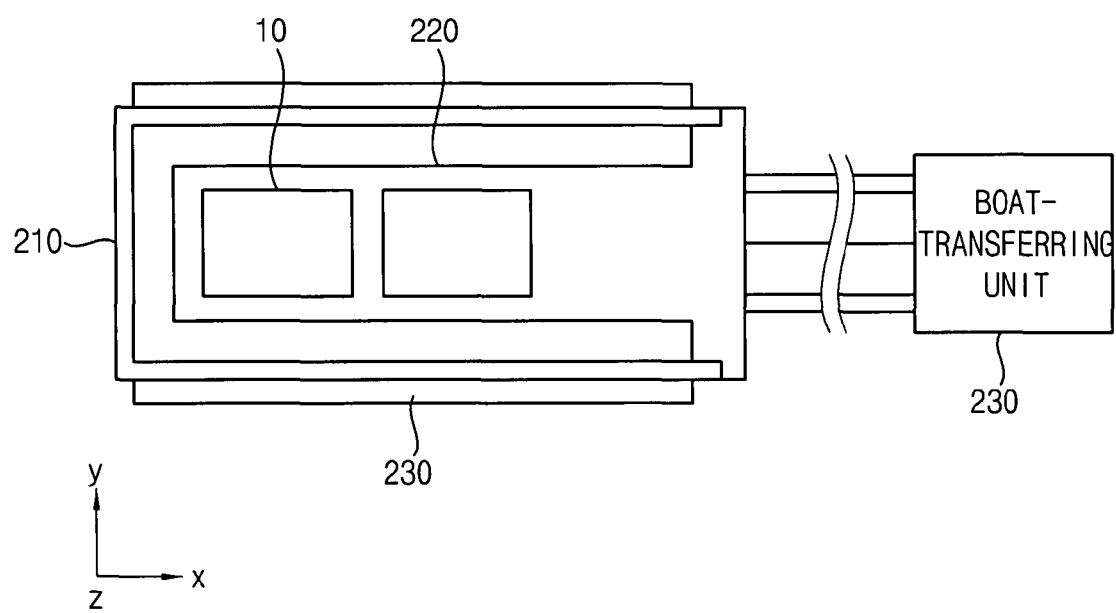
FIG. 3 is a plan view illustrating a reaction chamber to which a boat is transferred using a boat-transferring unit of the system in FIG. 1.
Figure 4:
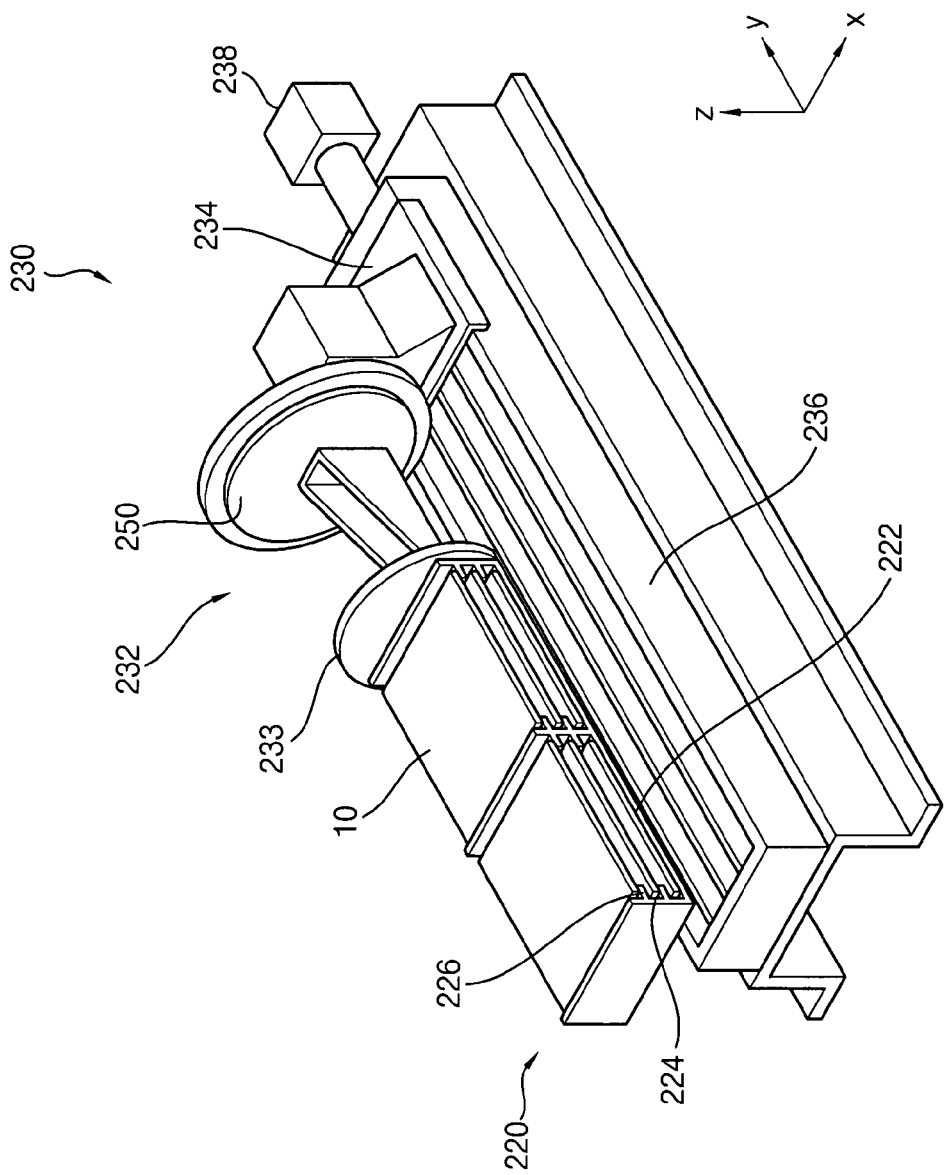
FIG. 4 is a perspective view illustrating the boat and the boat-transferring unit in FIG. 3.
Figure 5:
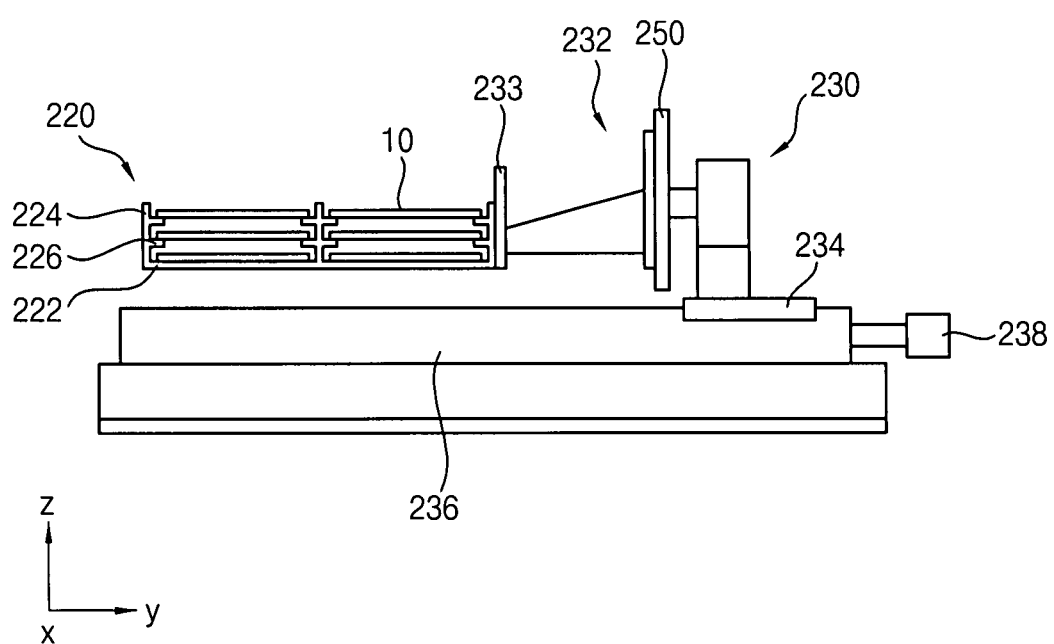
FIG. 5 is a side view illustrating the boat and the boat-transferring unit in FIG. 4.

FIG. 3 is a plan view illustrating a reaction chamber to which a boat is transferred using a boat-transferring unit of the system in FIG. 1, FIG. 4 is a perspective view illustrating the boat and the boat-transferring unit in FIG. 3, and FIG. 5 is a side view illustrating the boat and the boat-transferring unit in FIG. 4.

Referring to FIGS. 3 to 5, the boat 220 has a multi-step structure configured to receive the substrates 10 on which the catalyst layer is formed.

In this example embodiment, the boat 220 may have a structure including a bottom portion 222, first protrusions 224 and second protrusions 226. Particularly, the bottom portion 222 is placed on a plane defined by the x-axis and the y-axis. The first protrusions 224 are protruded from the bottom portion 222 along a z-axis to allow the boat 220 to be loaded with the substrates 10. The second protrusions 226 are protruded from inner faces of the first protrusions 224 along the y-axis to provide the boat 220 with the multi-step structure in which the substrates 10 are received.

Here, to stack the substrates 10 along any one of the x-axis and the y-axis, the number of the first protrusions 224 may be at least three.

When the substrate-transferring unit 240 illustrated later loads the substrates 10 having the catalyst layer into the boat 220, the boat-transferring unit 230 transfers the boat 220 into the reaction chamber 210. That is, the boat-transferring unit 230 transfers the boat 220 with the substrates 10 so that the substrates 10 are transferred simultaneously.

Further, when the boat 220 is transferred, the number of the substrates 10 loaded into the boat 220 may vary in accordance with a worker's selections. After the carbon nanotube 20 is synthesized using the substrates 10 in the boat 220, the boat-transferring unit 230 transfers the boat 220 from the inside of the reaction chamber 210 to the outside of the reaction chamber 210.

The boat-transferring unit 230 includes a transferring member 232, a guiding member 236 for guiding the transferring of the transferring member 232, and a first driving member 238 for driving the transferring member 232. The transferring member 232 is combined with a side face of the boat 220. For example, the transferring member 232 may be combined with an outermost one of the first protrusions 224.

The transferring member 232 includes a supporting block 233 combined with the boat 220 to support the boat 220, and a sliding block 234 combined with the supporting block 233 and slidably connected to the guiding member 236.

Here, a range and uniformity of a temperature, under which the carbon nanotube is effectively synthesized, may be formed at an innermost space in the reaction chamber 210. Thus, the supporting block 233 is moved to the innermost space in the reaction chamber 210. Further, to stably support the boat 220, the supporting block 233 may have a portion placed under a bottom portion 222 of the boat 220 to support the bottom portion 222 of the boat 220.

The sliding block 234 is slidably combined with the guiding member 236. Thus, the sliding block 234 is moved into the reaction chamber 210 through the entrance 212. In this example embodiment, the sliding block 234 may include a rail extending through the entrance 212 of the reaction chamber 210.

Here, a coupling force between the sliding block 234 and the guiding member 236 may correspond to a force for supporting the boat 220 with the supporting block 233. Thus, a contact area between the sliding block 234 and the guiding member 236 may be enlarged to increase the coupling force. Alternatively, the bottom portion 222 of the boat 210 may be combined with the guiding member 236 to directly support the boat 210 with the guiding member 236. To more stably support the boat 220, the guiding member 236 may extend to the innermost space in the reaction chamber 210.

The first driving member 238 generates power for transferring the transferring member 232 and transmits the power to the guiding member 236. For example, the first driving member 238 may include a linear motor integrally formed with the guiding member 236. Alternatively, the first driving member 238 may include an accurately controllable servo motor, and the guiding member 236 may include a driving belt driven by the servo motor. Further, the first driving member 238 may directly transmit the power to the transferring block 232 to slide the transferring block 232 on the guiding block 236.

Further, the apparatus 200 may include a shutter 250 for isolating the reaction chamber 210 from the outside when the transferring member 232 transfers the boat 220 into the reaction chamber 210.

In this example embodiment, the shutter 250 may have a structure interposed between the supporting block 233 and the sliding block 234. Alternatively, the shutter 250 may have a structure installed at edges of the supporting block 233 and the sliding block 234 to block the entrance 212 of the reaction chamber 210. Thus, the shutter 250 may open and close the entrance 212 of the reaction chamber so that a time for manufacturing the carbon nanotube 20 may be shortened.

A process for transferring the substrates 10 using the boat 220 and the boat-transferring unit 230 is carried out as follows. The boat 220 having the multi-step structure configured to receive the substrates 10 is located outside of the reaction chamber 210. The substrate-transferring unit 240 loads the substrates 10 into the boat 220.

After a desired number of the substrates 10 are loaded into the boat 220, the boat 220 loaded with the substrates 10 are transferred to a synthesis space for synthesizing the carbon nanotube 20, i.e., the inside of the reaction chamber 210.

The reaction chamber 210 is isolated from the outside as soon as the boat 220 is transferred. The carbon nanotube 20 is then synthesized in the reaction chamber 210 using the catalyst on the substrates 10. The boat 210 loaded with the substrates having the carbon nanotube 20 is transferred from the inside of the reaction chamber 210 to the outside of the reaction chamber 210.

Therefore, the process for transferring the substrates 10 may be effectively carried out by loading the substrates 10 into the boat 210 having the multi-step structure, and by transferring the boat 210 into the reaction chamber 210.

As a result, a process for synthesizing the carbon nanotube 20 using the substrates 10 may be effectively performed.

Further, the boat 220 loaded with the substrates 10 slides on the rail-shaped guiding member 236 so that the boat 220 may not be deflected while the boat 220 is transferred into the reaction chamber 210.

The substrate-transferring unit 240 is arranged outside of the reaction chamber 210. The substrate-transferring unit 240 loads the substrates 10 into the boat 220 outside of the reaction chamber 210.

Hereinafter, the substrate-transferring unit 240 is illustrated in detail with reference to FIG. 6.

Figure 6:
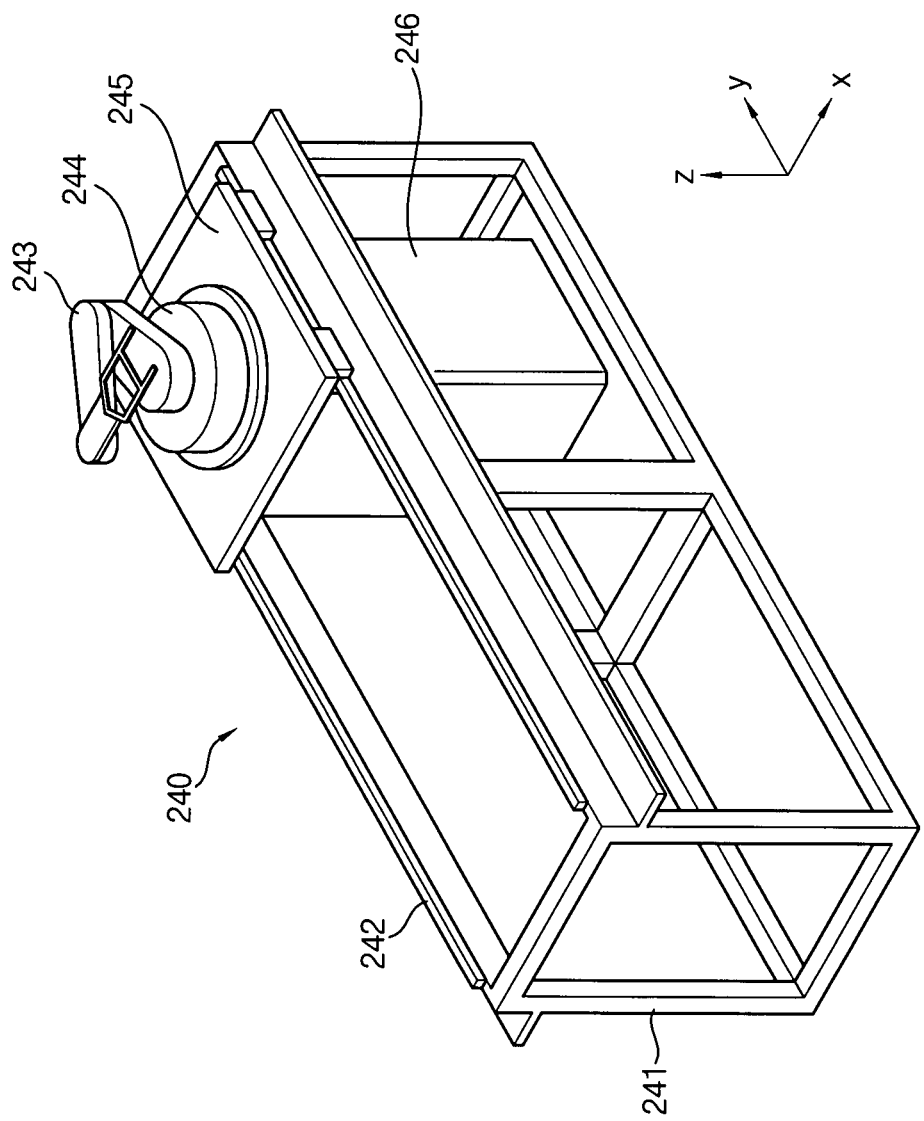
FIG. 6 is a perspective view illustrating a substrate-transferring unit of the system in FIG. 1.

FIG. 6 is a perspective view illustrating a substrate-transferring unit of the system in FIG. 1.

Referring to FIGS. 1 and 6, the substrate-transferring unit 240 includes a first frame 241, a linkage 243, a lifter 244, a slider 245 and a second driving member 246.

The first frame 241 serves as a structure configured to support the substrate-transferring unit 240. The first frame 241 is arranged in parallel with a lengthwise direction of the boat 220 at the entrance 212 of the reaction chamber 210. A guide rail 242 is formed on both upper edges of the boat 220 along the lengthwise direction of the boat 220.

The linkage 243 includes a first arm rotatably connected to the lifter 244, a second arm rotatably connected to the first arm, and a blade rotatably connected to the second arm. One of the substrates 10 for synthesizing the carbon nanotube 20 is placed on the blade. The first arm, the second arm and the blade in the linkage 243 are separately rotated on the plane defined by the x-axis and the y-axis.

The lifter 244 is combined with the first arm of the linkage 243. The lifter 244 upwardly and downwardly moves the linkage 243 along the z-axis substantially perpendicular to the plane defined by the x-axis and the y-axis. In this example embodiment, the lifter 244 may have a cylindrical shape.

The slider 245 is combined with a bottom portion of the lifter 244. The slider 245 is slidably connected to the guide rail 242 of the first frame 241. Thus, the lifter 244 is moved along a lengthwise direction of the guide rail 242 by sliding the slider 245 on the guide rail 242.

The second driving member 246 is combined with a bottom portion of the slider 245. The second driving member 246 is positioned in the first frame 241. The second driving member 246 generates power for driving the linkage 243, the lifter 244 and the slider 245, respectively. Alternatively, the second driving member 246 may directly transmit the power to the guide rail 242.

The collecting unit 300 collects the substrates 10, on which the carbon nanotube 20 is formed, which are transferred from the substrate-transferring unit 240. The coating unit 400 coats the catalyst layer on the substrates 10.

Hereinafter, the collecting unit 300 and the coating unit 400 are illustrated in detail with reference to FIGS. 7 and 8.

Figure 7:
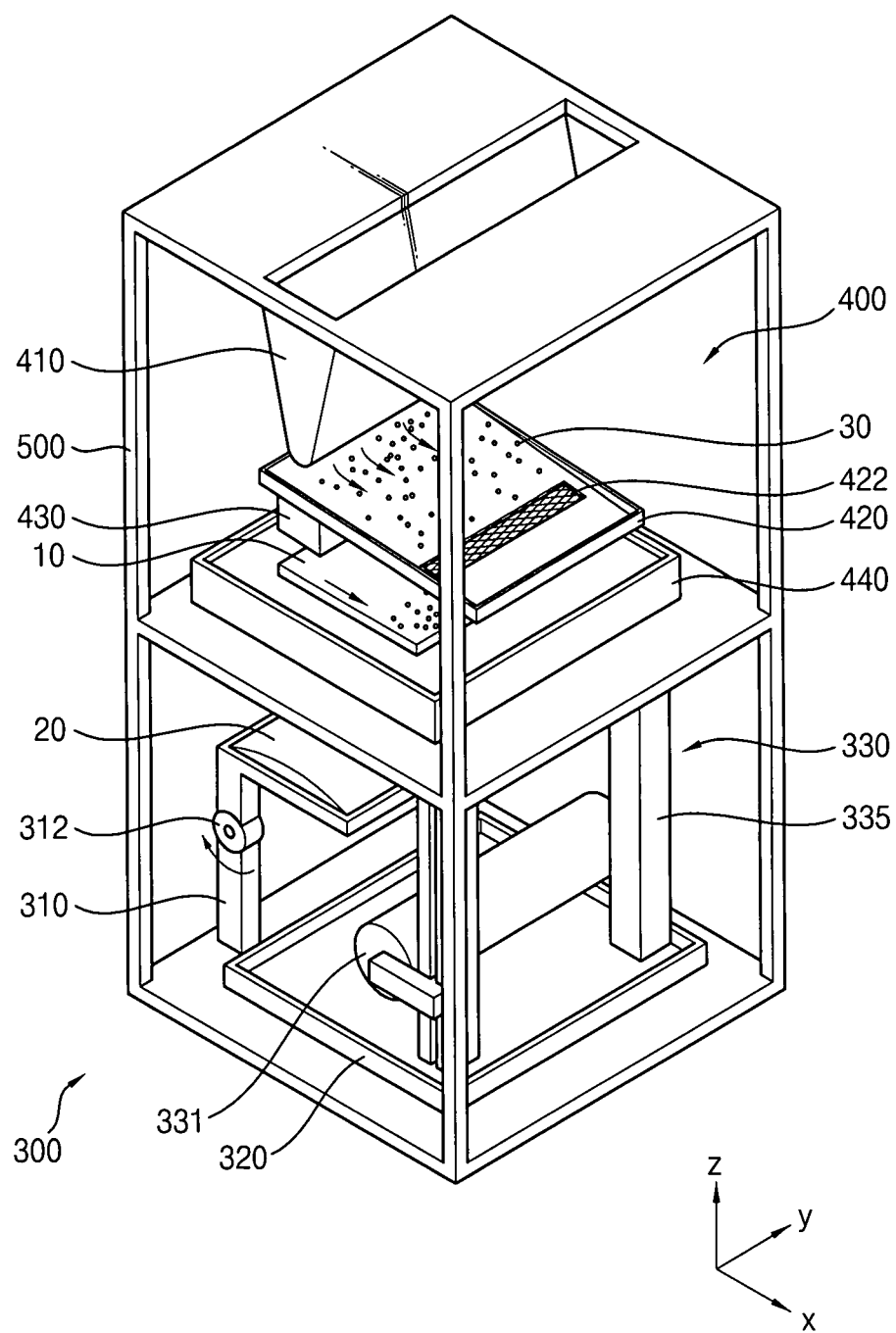
FIG. 7 is a perspective view illustrating a coating unit and a collecting unit of the system in FIG. 1.
Figure 8:
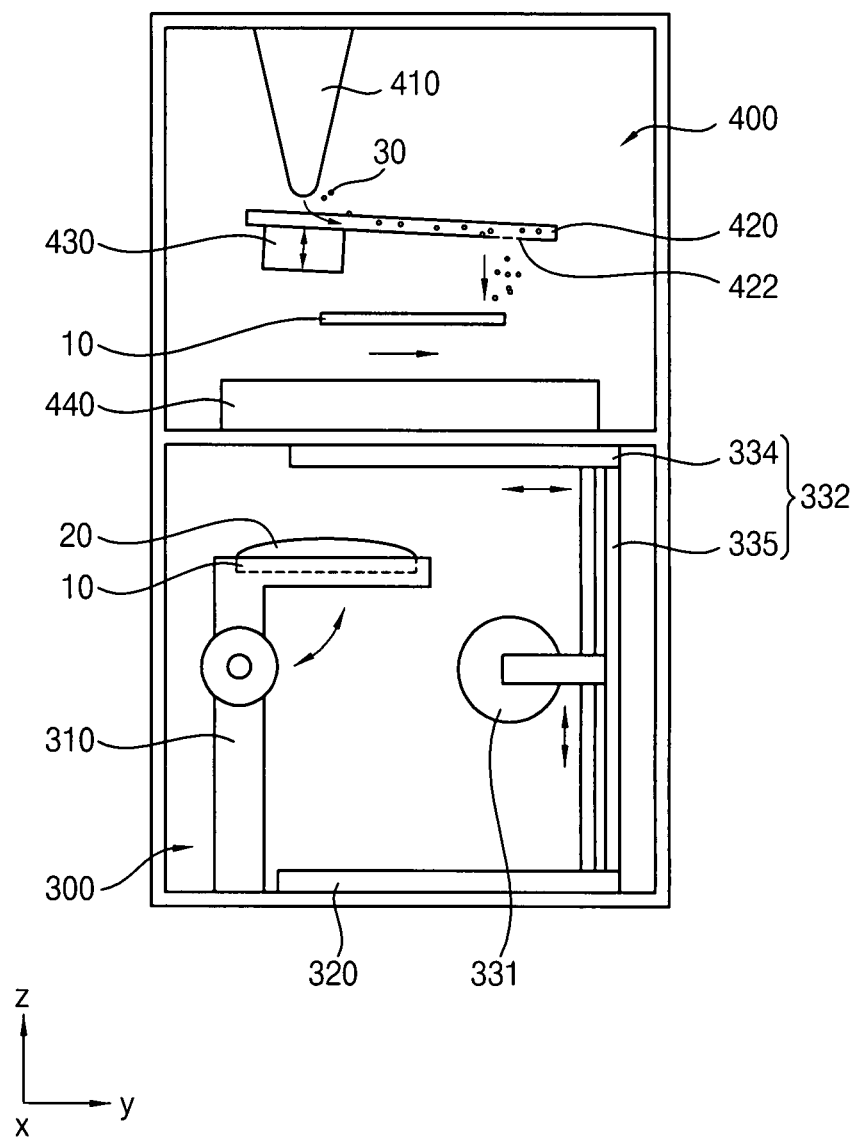
FIG. 8 is a side view illustrating the coating unit and the collecting unit in FIG. 7.

FIG. 7 is a perspective view illustrating a coating unit and a collecting unit of the system in FIG. 1, and FIG. 8 is a side view illustrating the coating unit and the collecting unit in FIG. 7.

Referring to FIGS. 7 and 8, the collecting unit 300 and the coating unit 400 are vertically stacked. Thus, the system 1000 further includes a second frame 500 configured to support the collecting unit 300 and the coating unit 400.

In this example embodiment, the coating unit 400 is arranged on the collecting unit 300 according to characteristics of the collecting process and the coating process. Particularly, when the collecting unit 300 is arranged on the coating unit 400, the carbon nanotube 20 on the substrates 10 collected by the collecting unit 300 may flow onto the substrates 10 in the coating unit 400. Therefore, to prevent the inflow of the carbon nanotube 20, the coating unit 400 is placed on the collecting unit 300.

Further, the induction fan 130 of the system chamber 100 induces the inert gas Ig toward the lower space of the system chamber 100 to aid the prevention of the inflow of the carbon nanotube 20. Here, since other structures do not exist over a top portion of the coating unit 400, the catalyst 300 may be readily provided to the coating unit 400 through the top portion of the coating unit 400. Alternatively, the collecting unit 300 may be placed on the coating unit 400 according to characteristics of other processes.

As mentioned above, the collecting unit 300 and the coating unit 400 are vertically stacked. Thus, the collecting unit 300 and the coating unit 400 may occupy a small area in the system chamber 100. As a result, space utilization in the system chamber 100 may be improved.

The collecting unit 300 includes a first separating member 310, a first receptacle 320 and a second separating member 330.

The first separating member 310 receives one of the substrates 10 having the carbon nanotube 20 horizontally transferred from the substrate-transferring unit 240. The first separating member 310 is rotated with respect to a hinged portion 312 to rotate the one of the substrates 10 to a vertical orientation. Thus, faces of the rotated one of the substrates 10 become substantially parallel with the z-axis. As a result, the carbon nanotube 20 on the rotated one of the substrates 10 falls down due to gravity to be primarily separated from the rotated one of the substrates 10.

The first receptacle 320 is positioned at a place where the carbon nanotube 20 falls down to collect the carbon nanotube 20. Here, to receive all of the carbon nanotube 20, the first receptacle 320 may have a large size within an allowable range.

The second separating member 330 secondarily separates a remaining portion of the carbon nanotube 20 on the rotated one of the substrates 10. The secondarily separated carbon nanotube 20 falls down to the first receptacle 320.

In this example embodiment, the second separating member 330 may include a contactor 331 making contact with the rotated one of the substrates 10 to apply physical force to the rotated one of the substrates 10, thereby separating the remaining portion of the carbon nanotube 20 from the rotated one of the substrates 10. For example, the contactor 331 may include a brush, a knife, etc. The second separating member 330 may further include a robot mechanism 332 for horizontally and vertically moving the contactor 331 toward the rotated one of the substrates 10.

The robot mechanism 332 includes a first robot 334 combined with the contactor 331 to move the contactor 331 along the z-axis, and a second robot 335 combined with the first robot 334 to move the first robot 334 along any one of the x-axis and the y-axis toward the rotated one of the substrates 10.

A process for collecting the carbon nanotube 20 on one of the substrates 10 using the collecting unit 300 is carried out as follows. The first separating member 310 receives the one of the substrates 10 having the carbon nanotube 20 from the substrate-transferring unit 240.

The first separating member 310 is rotated with respect to the hinged portion 312 to rotate the one of the substrates 10 to a vertical orientation. Thus, the carbon nanotube 20 on the rotated one of the substrates 10 falls down to the first receptacle 320. The first robot 334 and the second robot 335 move the contactor 331 to contact the contactor 331 with an upper end of the rotated one of the substrates 10.

The first robot 334 downwardly moves the contactor 331 to secondarily separate the carbon nanotube, 20 from the rotated one of the substrates 10. The secondary separated carbon nanotube 20 is collected in the first receptacle 320. The contactor 331 is then moved from the rotated one of the substrates 10. The first receptacle 320 is moved to the outside of the system 1000. The carbon nanotube 20 in the first receptacle 320 may be stored in a vessel (not shown).

Therefore, the collecting unit 300 may automatically collect the carbon nanotube 20 on the one of the substrates 10 using the first separating member 310 and the second separating member 330.

The coating unit 400 includes a hopper 410, a selecting member 420, a vibrating member 430 and a second receptacle 440. The hopper 410 is installed at a bottom portion of the second frame 500. The hopper 410 receives the catalyst 30 supplied from the outside. Further, the hopper 410 releases the catalyst 30 through an opening formed at a lower end of the hopper 410.

The selecting member 420 is arranged under the hopper 410. The selecting member 420 may have a thin vessel shape in which the catalyst 30 is received. Further, the selecting member 420 may be arranged at a slant for allowing the catalyst 30 released from the hopper 410 to flow along any one of the x-axis and the y-axis.

The selecting member 420 selects particles of the catalyst 30 released from the hopper 410 by the size of the particles of the catalyst 30. Thus, the selecting member 420 may include a mesh 422 for classifying the catalyst 30 by the size of the particles. One of the substrates 10 from which the carbon nanotube 20 is collected by the collecting unit 300 is moved at a constant speed under the selecting member 420. Therefore, the catalyst 30 with particles having a size smaller than that of the mesh 422 is coated on the one of the substrates 10 moved under the selecting member 420.

The vibrating member 430 is combined with a bottom portion of the selecting member 420. The vibrating member 430 applies a vibration to the selecting member 420. That is, the vibrating member 430 uniformly distributes and also facilitates the catalyst 30 in the selecting member 420. As a result, the vibrating member 430 may allow a desirable amount of the catalyst 30 to be released through the mesh 422 of the selecting member 420 so that the catalyst layer 30 on the one of the substrates 10 moved under the selecting member 420 may have a uniform thickness.

The second receptacle 440 is arranged under the one of the substrates 10 moved under the selecting member 420. The second receptacle 440 receives a portion of the catalyst 30 that is not coated on the one of the substrates 10. The catalyst 30 in the second receptacle 440 is re-supplied to the hopper 410 so that costs for manufacturing the carbon nanotube may be reduced.

Additionally, the system 1000 may further include a storing unit 600 in the system chamber 100.

The storing unit 600 temporarily stores the substrates 10 on which the carbon nanotube 20 is formed, the substrates 10 on which the catalyst 30 is coated, and the substrates 10 before the catalyst 30 is coated. That is, since a time for processing the substrates 10 in the collecting unit 300 and the coating unit 400 is different from a time for processing the substrates 10 in the reaction chamber 210, the storing unit 600 temporarily stores the substrates 10 between the process performed in the collecting unit 300 and the coating unit 400 and the process performed in the reaction chamber 210. The substrates 10 in the storing unit 600 may be transferred from the substrate-transferring unit 240 or other transferring units.

Hereinafter, the storing unit 600 is illustrated in detail with reference to FIGS. 9 and 10.

Figure 9:
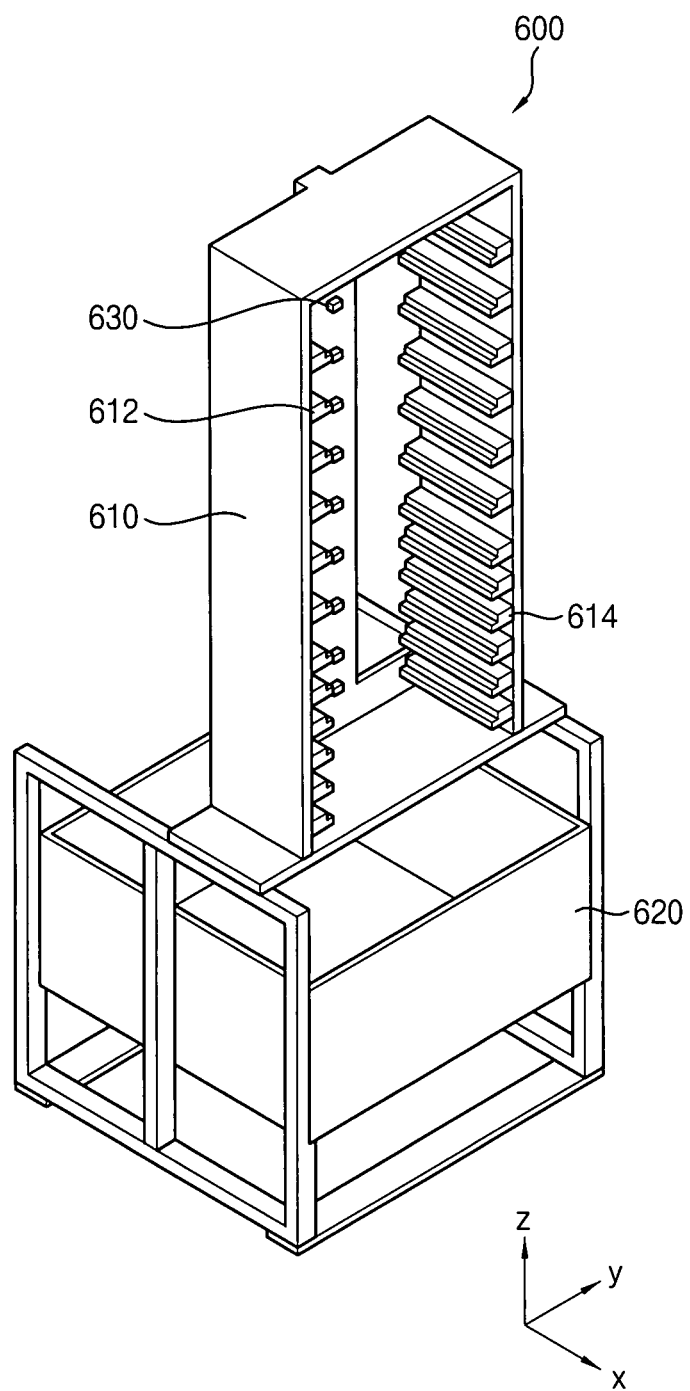
FIG. 9 is a perspective view illustrating a storing unit of the system in FIG. 1.
Figure 10:
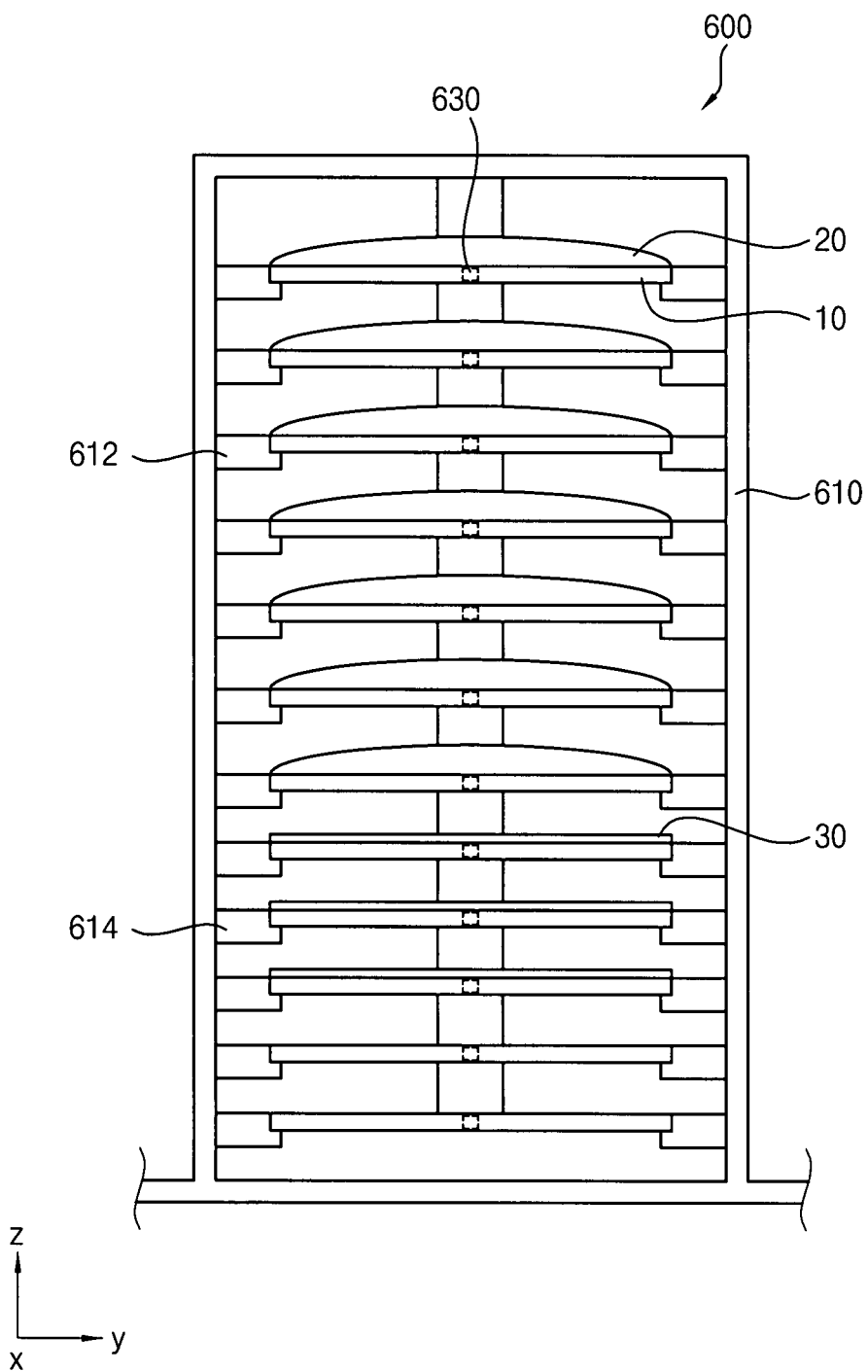
FIG. 10 is a front view illustrating a cassette of the storing unit into which substrates are loaded in FIG. 9.

FIG. 9 is a perspective view illustrating a storing unit of the system in FIG. 1, and FIG. 10 is a front view illustrating a cassette of the storing unit into which substrates are loaded in FIG. 9.

Referring to FIGS. 1, 9 and 10, the storing unit 600 includes a cassette 610, a third receptacle 520 and a detecting member 630.

The cassette 610 has an inner space where the substrates 10 having the carbon nanotube 20 and the substrates 10 having the catalyst 30 are received.

For example, first protrusions 612 are provided at an upper region of the cassette 610 to form six first storage spaces for storing the substrates 10 having the carbon nanotube 20. Further, second protrusions 614 are provided at a lower region of the cassette 610 to form six second storage spaces for storing the substrates 10 before coating the catalyst 30 or after coating the catalyst 30. Here, an interval between the first protrusions 612 may be wider than that between the second protrusions 614 according to a thickness of the carbon nanotube 20.

The third receptacle 620 is placed under the cassette 610. The third receptacle 620 collects the carbon nanotube 20 separated from the substrates 10, which is caused by friction between the carbon nanotube 20 and the cassette 610, when the substrates 10 having the carbon nanotube 20 are loaded/unloaded into/from the cassette 610. Thus, the carbon nanotube 20 may not be wasted.

The detecting member 630 is provided to the cassette 610. The detecting member 630 detects whether the substrates 10 exist in the storage spaces or not. That is, the detecting member 630 detects whether the substrates 10 actually exist in the first storage space and the second storage space or not. Thus, movement positions and the transfer process of the substrate-transferring unit 240 may be automatically controlled.

Here, the substrate-transferring unit 240 operates between the boat-transferring unit 230 and the storing unit 600. Thus, the substrate-transferring unit 240 may be located at a central portion of the system chamber 100. As a result, the above-mentioned elements may be arranged at a peripheral region of the substrate-transferring unit 240.

Further, the system 1000 may additionally include a controlling unit 700 for controlling the heater 214 of the reaction chamber 210, the boat-transferring unit 230, and the substrate-transferring unit 240. Thus, since the process for manufacturing the carbon nanotube 20 may be integrally controlled by the controlling unit 700, the process for manufacturing the carbon nanotube 20 may be more effectively carried out.

According to the present invention, a plurality of substrates may be transferred simultaneously using a boat in a system. Thus, a process for manufacturing a carbon nanotube may have improved efficiency.

Having described the preferred embodiments of the present invention, it is noted that modifications and variations can be made by persons skilled in the art in light of the above teachings. It is therefore to be understood that changes may be made in the particular embodiment of the present invention disclosed which is within the scope and the spirit of the invention outlined by the appended claims.

What is claimed is:

1. A system for manufacturing a carbon nanotube, comprising:

i) a reaction chamber having an inner space where the carbon nanotube is synthesized, a reaction gas being introduced into the reaction chamber;

ii) a multi-step structured boat for receiving a plurality of substrates on which a catalyst reacted with the reaction gas is coated;

iii) a substrate-transferring unit arranged outside of the reaction chamber to load the substrates into the boat outside of the reaction chamber comprising:

a linkage for holding the substrate in the boat, the linkage being rotated on a horizontal plane;

a lifter combined with the linkage to upwardly and downwardly move the linkage;

a slider combined with the lifter to horizontally move the lifter; and a driving member for driving the linkage, the lifter and the slider, respectively;

iv) a boat-transferring unit for transferring the boat between the outside and the inside of the reaction chamber comprising:

a transferring member combined with the boat;

a guiding member for guiding a movement of the transferring member;

a driving member for driving the transferring member to transfer the boat between the inside and the outside of the reaction chamber; and a shutter for isolating the reaction chamber from the outside when the boat is transferred into the reaction chamber;

v) a coating unit for coating the catalyst on the substrates comprising:

a hopper for storing and releasing the catalyst;

a selecting member for selecting the catalyst released from the hopper by sizes of the catalyst and for releasing the selected catalyst to the substrates moved under the selecting member; and a vibrating member combined with the selecting member to uniformly distribute the catalyst released from the hopper by vibrating the selecting member;

vi) a collecting unit for separating the carbon nanotube from the substrates and for collecting the separated carbon nanotube, the collecting unit comprising:

a first separating member for rotating the substrates having the carbon nanotube to a vertical orientation to primarily separate the carbon nanotube from the substrates;

a second separating member for secondarily separating the carbon nanotube remaining on the rotated substrates; and a receptacle for collecting the carbon nanotube separated from the substrates; and vii) a system chamber arranging a space for the reaction chamber, the substrate transferring unit, the boat transferring unit, the coating unit and the collecting unit;

wherein the coating unit and the collecting unit are vertically stacked.

2. The system of claim 1, further comprising an induction fan installed at a top portion of the system chamber to induce an inert gas introduced into the system chamber toward a lower space of the system chamber.

3. The system of claim 1, further comprising a storing unit installed in the system chamber to temporarily store the substrates.

4. The system of claim 3, wherein the storing unit comprises a receptacle for collecting the carbon nanotube partially separated from the substrates.

* * * * *